United States Patent
Adds

(10) Patent No.: US 6,332,504 B1
(45) Date of Patent: Dec. 25, 2001

(54) ELECTRIC VEHICLES

(76) Inventor: Graham John Adds, 71 Bain Avenue, Camberley, Surrey (GB), GU15 2RY ( * ) Notice: Subject to any disclaimer, the term of this patent is extended or adjusted under 35 U.S.C. 154(b) by 0 days.

(21) Appl. No.: 09/402,368

(22) PCT Filed: Mar. 31, 1998

(86) PCT No.: PCT/GB98/00953
§ 371 Date: Feb. 22, 1998
§ 102(e) Date: Feb. 22, 1998

(87) PCT Pub. No.: WO98/45928
PCT Pub. Date: Oct. 15, 1998

(30) Foreign Application Priority Data

Apr. 4, 1997 (GB) .................................................. 9706909

(51) Int. Cl.$^7$ .................................................. B60K 1/00
(52) U.S. Cl. .................. 180/65.2; 180/65.4; 180/233
(58) Field of Search .................. 180/65.1–65.5, 180/233, 242, 243, 245

(56) References Cited

U.S. PATENT DOCUMENTS

| | | | |
|---|---|---|---|
| 3,623,568 | * | 11/1971 | Mori .................................. 180/65 A |
| 3,858,674 | * | 1/1975 | Tabor ................................ 180/65 R |
| 3,904,883 | | 9/1975 | Horwinski ............................ 290/50 |
| 3,970,163 | * | 7/1976 | Kinoshita ........................... 180/65 A |
| 4,165,795 | * | 8/1979 | Lynch et al. ........................ 180/65 A |
| 4,233,858 | * | 11/1980 | Rowlett .................................. 74/675 |
| 4,309,620 | * | 1/1982 | Bock .................................... 290/4 R |
| 4,531,605 | * | 7/1985 | Scholz et al. ........................ 180/165 |
| 5,788,006 | * | 8/1998 | Yamaguchi ......................... 180/65.2 |
| 5,935,035 | * | 8/1999 | Schmidt .................................. 475/5 |
| 5,984,034 | * | 11/1999 | Morisawa et al. .................. 180/65.2 |
| 6,041,877 | * | 3/2000 | Yamada et al. ..................... 180/65.2 |
| 6,263,267 | * | 7/2001 | Anthony et al. ....................... 701/22 |

FOREIGN PATENT DOCUMENTS 41 08 386A   9/1992 (DE).
1 529 504A   10/1968 (FR).

* cited by examiner

Primary Examiner—J. J. Swann
Assistant Examiner—L. Lum
(74) Attorney, Agent, or Firm—Lowe Hauptman Gilman & Berner, LLP

(57) ABSTRACT

The motor of an electric car has its armature coupled to one drive shaft and its case coupled to another drive shaft The front drive shaft drives the front axle, i.e. the front pair of wheels, through a differential; the rear drive shaft drives the rear axle, i.e. the back pair of wheels, through a gearbox and a differential The motor is normally energized to drive the two axles in the same direction. An electric auxiliary motor is coupled to the rear drive shaft from the main motor. The vehicle is operable in first and second modes in which the ratios of the front and back differentials (including effect of the gearbox) are respectively greater than and less than 1:1.

12 Claims, 2 Drawing Sheets

ELECTRIC VEHICLES

The present invention relates to electric vehicles, and more particularly to the drive system of such vehicles.

Cars and similar vehicles have, ever since their origins a century ago, largely been driven by internal combustion engines, using either petrol or diesel fuel. Two other forms of engine, viz electric and steam, have been used at various times, but neither has achieved major success. With the growing present concerns over pollution and oil conservation, electric vehicles are receiving increased attention.

Trams and trolley-buses are powered from conductors laid on, under, or over the roadway, so they are constrained to predetermined routes. Disregarding such special cases, however, an electric vehicle is battery powered, and the battery can be charged from a suitable electric supply point fed by a public utility (typically the grid). The generation of the electricity for the battery charging will generally be more efficient and less polluting than an internal combustion engine, and can use a variety of energy sources, including renewable sources. An electric motor can also provide regenerative braking.

Electric vehicles have, however, some major problems. One is the weight of the batteries required to give an adequate performance (vehicle range and speed for a battery charge), which in turn is dependent on the efficiency of the system. Another is the cost of the system, which again is dependent to some extent on the system efficiency. Adding more batteries to increase the range adds more weight to the vehicle, making it less efficient.

A vehicle driven by internal combustion normally has a single engine which drives the wheels. Traditionally, the engine drives the rear wheels, though more recently, front wheel drive and 4 wheel drive systems have become popular. The usual position for the engine is at the front of the vehicle, so a front wheel drive system avoids the need for a transmission shaft (propeller shaft) running along the length of the vehicle. A 4 wheel drive system is more complicated than a conventional 2 wheel drive system, but gives better road grip in poor driving conditions.

The obvious way of designing an electric vehicle system is to simply take a conventional internal combustion engine system and replace the engine by an electric motor. The output shaft of the electric motor will be coupled to the wheels in substantially the same way as the output shaft of the internal combustion engine, possibly with some modifications in the gearing arrangements.

An alternative approach is more radical. Since electric motors are simpler and more flexible than internal combustion engines, it has been proposed to provide a separate electric motor for each driven wheel of the vehicle, so that the vehicle has 2 or 4 electric motors.

These two approaches both have disadvantages. A problem with the simple substitution is that an electric motor has different characteristics from an internal combustion engine, so the system is likely to have considerable inefficiencies. A problem with the separate motor for each wheel system is that the system requires 2 or 4 motors instead of 1, with the concomitant increase of cost and weight (even though the individual motors can be smaller); also, the design of a control system for this system becomes complicated.

The general object of the present invention is to provide an electric vehicle with an improved motor system.

Accordingly the present invention provides an electric vehicle having an electric motor having its armature coupled to one drive shaft and its case coupled to another drive shaft, the two drive shafts driving the front and rear axles, ie the front and back pairs of wheels, respectively, through respective differentials, characterized in that a gear-box having a plurality of ratios is included in at least one of the drive shafts.

An electric motor is normally thought of as having a fixed structure, which we here term its case, in which an armature rotates. The case includes fixed magnetic means, either fixed magnets or field windings. However, the torque is essentially developed between the armature and the case; the torque developed on the armature is matched by an equal and opposite torque on the case. In the present invention, the armature is coupled to one axle, eg the front axle, and the case is mounted so that it can also rotate and is coupled to the other axle (in this case the back axle).

In principle, of course, an internal combustion engine also generates a torque between the output shaft and the engine body. But with a conventional internal combustion engine, it would be totally impracticable to allow the engine body to rotate. With an electric motor, on the other hand, there is no major difficulty of principle in allowing the motor case to rotate as well as the armature.

The electric motor thus effectively has 2 drive shafts, one from the armature and one from the case. These are coupled to the front and rear wheels of the vehicle, preferably through respective differentials of generally conventional form. These differentials may be chosen to give a desired ratio between the two drive shafts of the motor. It will be realized that the road wheels of the vehicle all normally run at the same speed; so, analysing backwards from that fact, the relative speeds of the two drive shafts of the motor are determined by the ratio of the front and back differentials. (It is convenient to refer generally to the drive shafts, the motor driving the drive shafts, etc, even though, as will appear below, the power flow along one or both the drive shafts may in certain circumstances be from the wheels to the motor, ie driving the motor as a generator.)

Depending on the circumstances, the 2 drive shafts may drive the respective axles in either the same direction or the opposite directions. In other words, if the 4 wheels are all rotating at the same speed, the two drive shafts may be rotating in either the same direction or in opposite directions, depending on the circumstances. It is generally preferred for the rotations to be in the same direction, for reasons discussed below. However, there may be special circumstances in which rotation in opposite directions may be used.

Additionally, there may be provided an auxiliary motor, coupled to the rear drive shaft, which can be used to provide additional driving force. This auxiliary motor may be an electric motor with its armature mounted coaxially on the relevant shaft and its case fixed, so that it applies an additional torque to the shaft. When this motor is not energized, it will effectively free-wheel and have no significant effect.

Alternatively, the auxiliary motor may be coupled to the relevant drive shaft via suitable gearing. Again, when it is not energized, it will have no significant effect. However, in this position, a clutch can be incorporated between it and the relevant drive shaft if desired. If desired, an internal combustion engine can be used instead of the auxiliary motor in this configuration, as a source of additional driving force.

The present invention thus provides a more efficient and flexible motor system for an electric vehicle.

An electric vehicle embodying the invention will now be described, by way of example, with reference to the drawings, in which.

Figure 1:
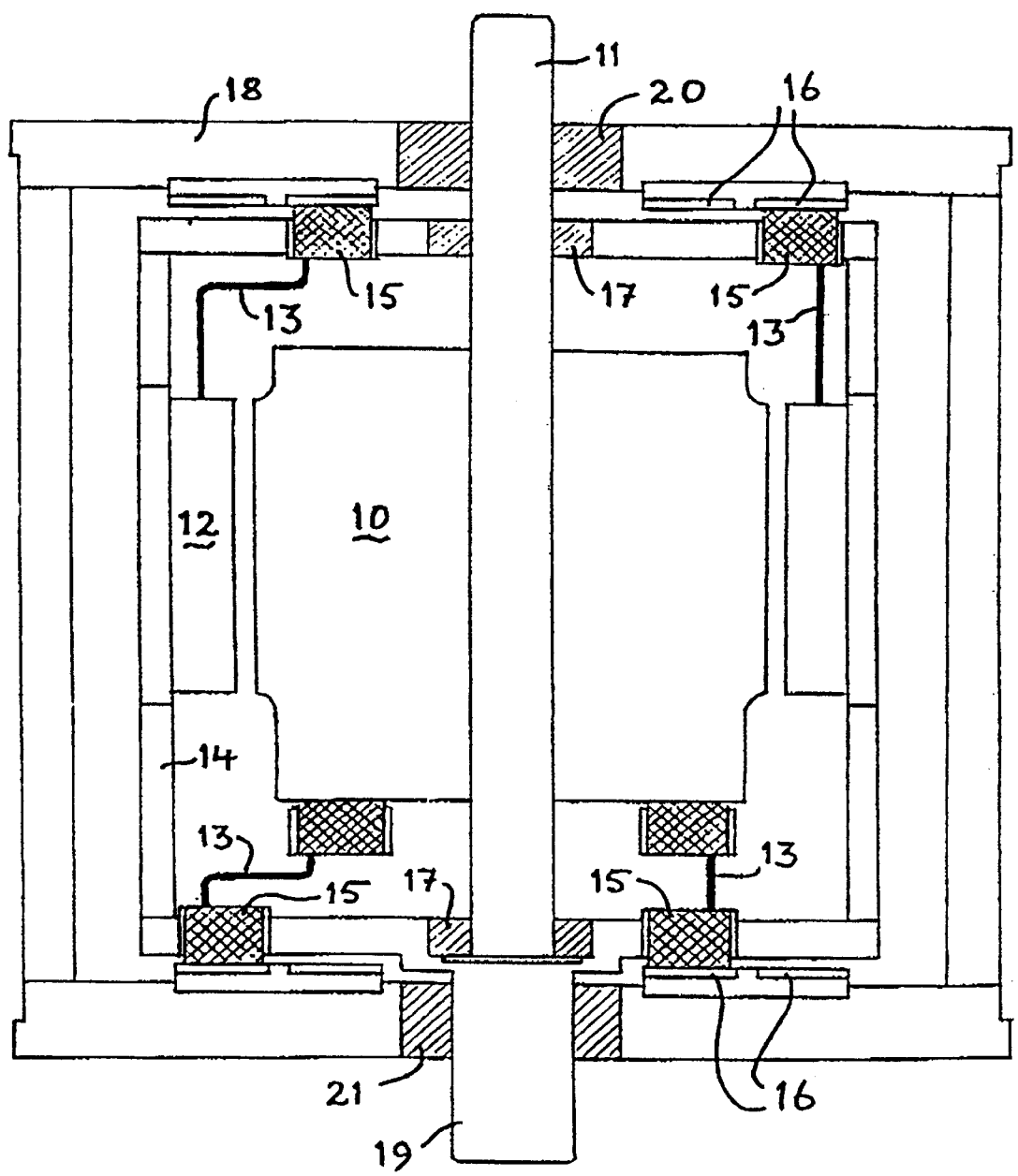
FIG. 1 shows the main motor of the vehicle.

FIG. 1 shows a broadly conventional electric DC motor, made up of an armature 10 turning on a shaft 11, and field windings 12 supplied by leads 13, enclosed in a case 14. The leads 13 end in brushes 15 which supply current to the armature via slip rings 16. The armature shaft is mounted on bearings 17 in the case 14 at both ends, the shaft ending at one bearing, and extending through the other. This extending end is mounted on and extends through a bearing 20 in a cage 18 which surrounds the armature and is mounted on the vehicle body. At the opposite end, the motor case 14 is mounted in the cage 18 by a shaft 19 extending from the motor case 14, this shaft also extending through a bearing 21 in the cage 18. Two of the brushes 15 touch two of the annular contacts 16 respectively to supply the motor's armature, whilst the other two brushes 15 touch the other two annular contacts 15 to supply the motor's field windings. The motor is powered by four 12 V lead acid accumulators.

Figure 2:
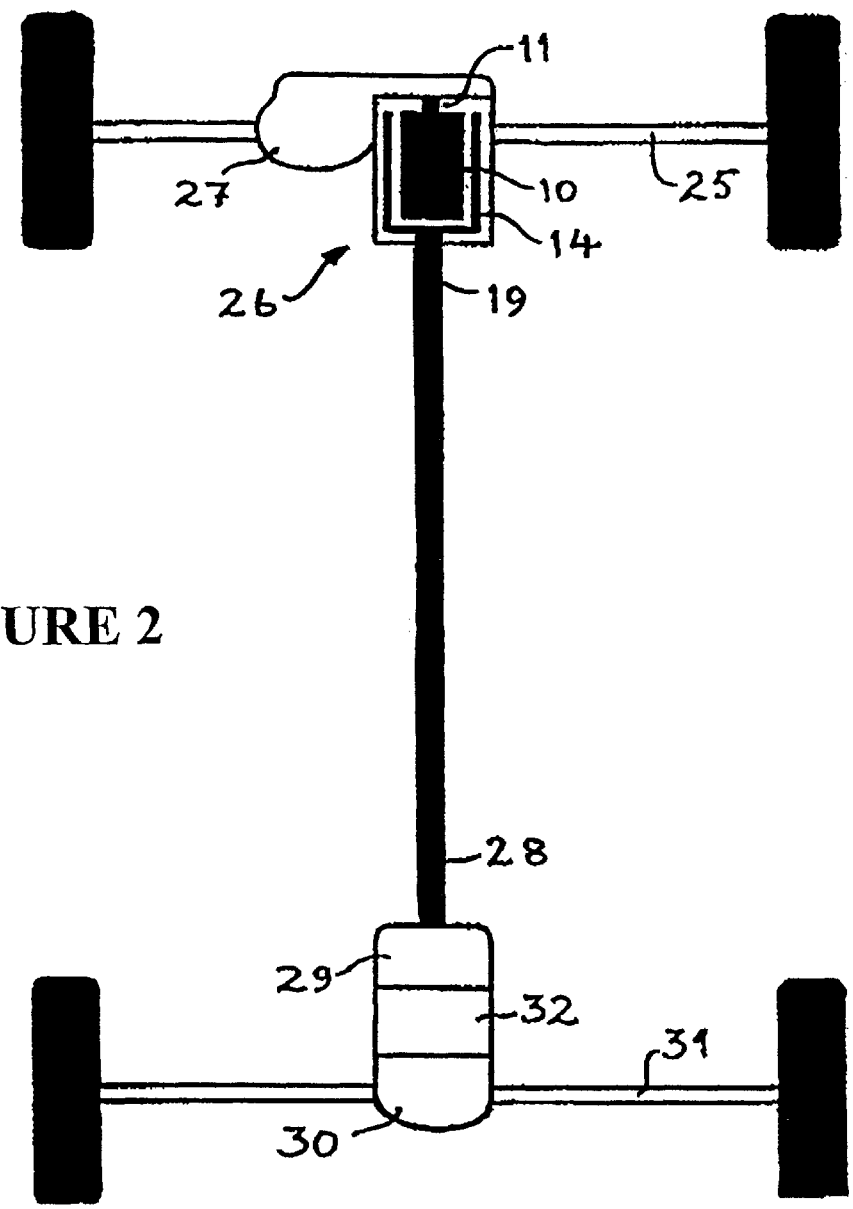
FIG. 2 is a simplified diagram of the drive system of the vehicle.

Referring to FIG. 2, power is transmitted to the front axle 25 of the vehicle from the armature shaft 11 of the motor 26 by a 2-speed gearbox and differential 27, and the transmission from the motor case shaft 19 is effected by a propeller shaft 28 leading to a rear 3-speed gearbox 29 and rear differential 30 for the back axle 31. A second motor 32, of conventional DC type and with its own set of accumulators, supplements the drive to the back axle 31. The case of this second motor is mounted on the vehicle chassis, and its armature is attached to the shaft, which runs straight through the auxiliary motor. (It will be realized that the torque produced by this auxiliary motor is equivalent to providing means for generating torque between the (rotating) motor case 14 and the (fixed) motor cage 18.)

Different gears are selected from gear combinations of the two gearboxes. The total gear ratios (including the gearing of the differential) of the front gearbox are 9:1 and 5:1, and the total gear ratios for the rear gearbox are 8.5:1, 6.5:1 and 4.5:1.

The vehicle has two basic modes of operation. Mode 1 is used for accelerating the vehicle from stationary; mode 2 is used for maintaining the vehicle going when it has reached running speed (typically 25–30 mph (40–50 km/h) and upwards). The motor armature is the prime mover element in both modes.

In mode 1, the ratio of the front and back differentials is approximately 2:1. The armature of the motor is the primary mover and drives the front wheels. The rear wheels are connected to the case, which runs at half the speed of the armature. This produces an input power, and doubles the speed of the motor, producing greater torque.

When running speed has been reached, mode 2 is entered. For this, the gear ratios are changed so that the lower ratio is at the front and the higher ratio at the back. This changes the motor into a generator. This would normally cause regenerative braking. However, because the motor case is rotating, the resistance normally caused by regeneration is transferred to the armature, which is connected to the front wheels. At this point, the armature is still the primary mover, driving the front wheels, while the motor case is driven by the rear wheels. The auxiliary motor combats the effect of resistance to the rear wheels and changes it into positive driving power to the front wheels.

In more detail, for the first mode, the front gear ratio is set at 9:1 and that of the rear at 4.5:1. The idea of this mode is primarily to achieve a lower voltage and higher rpm and to combat loss of rpm when changing up a gear. The power consumption in this mode is relatively high.

In this mode, for the vehicle to move it is essential for the overall gear ratio at the front to be higher than the overall gear ratio at the back. This determines which wheels the motor will drive; the motor will drive to the wheels with the higher ratio. The vehicle will move forward with the front wheels being driven by the motor. The rear wheels will rotate at the same speed, driving the motor case at a speed determined by the rear ratio (1:4.5). The sum of the rpm of the case and the rpm of the armature within the case is the rpm of the output shaft (ie the front drive shaft)- The smaller the difference in ratios, the slower the acceleration.

Once a speed of around 25–30 mph has been reached, the second mode can be selected, by changing over the gear ratios so that the lower ratio is at the front and the higher ratio at the back. Specifically, the front gear ratio is set at 5:1 and that of the rear at 8.5:1. The essential feature of this mode is that the motor case turns faster than its armature. This results in the motor operating to a considerable degree in reverse, ie as a generator. As a generator is essentially a motor being driven in reverse, it will have a negative torque similar to the positive torque of a motor, but as both the case and the armature are rotating, half the gross torque will attempt to accelerate the armature and in turn the vehicle and half will attempt to decelerate the case and in turn the vehicle in an attempt to stop the motion of the generator.

The auxiliary motor 32 is used to provide additional driving power to the rear axle in this mode, and will effectively provide acceleration in the second mode. This motor will drive on a low ratio (3.5:1), combatting the negative power coming from the main motor case and creating a positive torque to the rear wheels, giving more power for forward driving. This auxiliary motor can also be used in the first mode for extra power. If for example 50% of the negative power going to the rear wheels (ie 25% of the gross power of the main motor/generator) is compensated by this motor, the torque split on the main motor/generator will be changed to 75% accelerating the vehicle and 25% negative resistance.

The second motor also produces a 4 wheel drive effect.

At higher speeds using the second mode, the main motor/generator speed will increase, resulting in increased torque and current. To hold the main motor/generator speed within convenient limits (1600–2000 rpm (25–35 rps)), a third gear in the rear gearbox is therefore necessary. In this gear, the front gear ratio is 5:1 and rear gear ratio is 6.5:1.

For braking under normal conditions, both motors may be employed as generators, the regenerative braking slowing the vehicle whilst recharging the accumulators.

For reverse, the current to the motor is reversed. (Normally only the first mode will be used for reverse, as high speed driving in reverse is not normally appropriate.)

In a variant form of the system, the change-over between the two modes can be achieved by switching the direction of the current in the motor 10 instead of changing the gear ratios. This simplifies the required gearing, although it is still desirable to be able to change the gear ratios within a mode.

Figure 2A:
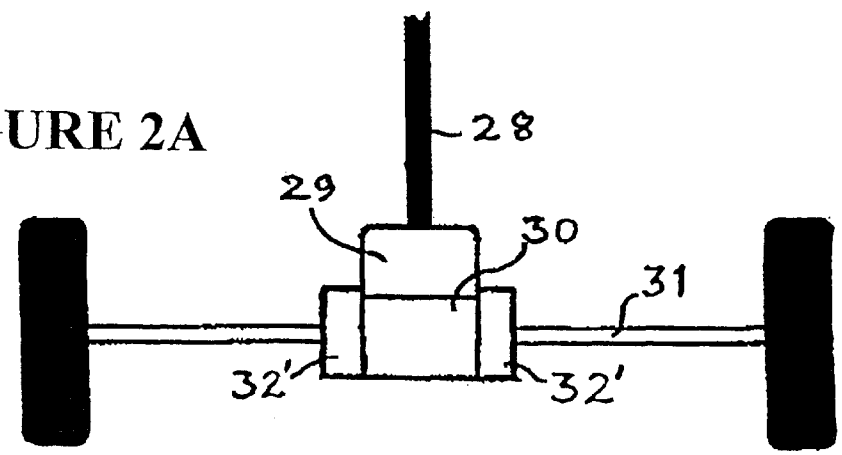
FIG. 2A shows a modification of the drive system of FIG. 2.

Other minor variants are also possible, as shown for example in FIG. 2A. In this variant, a pair of auxiliary motors 32' are used adjacent to the differential 30 instead of the single auxiliary motor in the shaft 28. This may make it easier to achieve low speed and high torque from the auxiliary motor(s).

In summary, the motor of an electric car has its armature 10 coupled to one drive shaft and its case 14 coupled to another drive shaft 28. The front drive shaft drives the front axle 25, ie the front pairs of wheel, through a differential 27; the rear drive shaft 28 drives the rear axle 31, ie the back pair of wheels, through a gearbox 29 and a differential 30. The motor is normally energized to drive the two axles in the same direction. An electric auxiliary motor 32 is coupled to the rear drive shaft 28 from the main motor. The vehicle is operable in first and second modes in which the ratios of the front and back differentials (including effect of the gearbox 32) are respectively greater than and less than 1:1.

What is claimed is:

1. An electric vehicle, comprising first and second drive shafts, a front axle carrying front wheels, a rear axle carrying rear wheels, an electric motor having an armature coupled to the first drive shaft and a case coupled to the second drive shaft, the first and second drive shafts respectively arranged for driving the front and rear axles through respective first and second differentials, and a gear-box having a plurality of ratios in at least one of the drive shafts.

2. The electric vehicle according to claim 1, wherein the vehicle is operable in first and second modes, the first mode being such that a first gear ratio from the motor to the front wheels is greater than a second gear ratio from the motor to the rear wheels, the second mode being such that the first gear ratio from the motor to the front wheels is less than the second gear ratio from the motor to the rear wheels.

3. The electric vehicle according to claim 2, further including an auxiliary motor coupled to one of the drive shafts from the electric motor.

4. The electric vehicle according to claim 3, wherein the auxiliary motor is an electric motor including a second armature mounted coaxially on said one of the drive shafts and a fixed case, the auxiliary motor being arranged for applying additional torque to said one of the drive shafts.

5. The electric vehicle according to claim 3, wherein the auxiliary motor is coupled to said one of the drive shafts via suitable gearing.

6. The electric vehicle according to claim 5, further including a clutch incorporated between the auxiliary motor and said one of the drive shafts.

7. The electric vehicle according to claim 3, wherein the auxiliary motor is an internal combustion engine.

8. The electric vehicle according to claim 1, further including an auxiliary motor coupled to one of the drive shafts from the electric motor.

9. The electric vehicle according to claim 8, wherein the auxiliary motor is an electric motor including a second armature mounted coaxially on said one of the drive shafts and a fixed case, the auxiliary motor being arranged for applying additional torque to said one of the drive shafts.

10. The electric vehicle according to claim 8, wherein the auxiliary motor is coupled to said one of the drive shafts via suitable gearing.

11. The electric vehicle according to claim 10, further including a clutch incorporated between the auxiliary motor and said one of the drive shafts.

12. The electric vehicle according to claim 8, wherein the auxiliary motor is an internal combustion engine.

* * * * *